(12) United States Patent
Lavoie et al.

(10) Patent No.: US 9,592,826 B2
(45) Date of Patent: Mar. 14, 2017

(54) SYSTEM AND METHOD FOR PARALLEL PARKING A VEHICLE

(71) Applicant: Ford Global Technologies, LLC, Dearborn, MI (US)

(72) Inventors: Erick Michael Lavoie, Dearborn, MI (US); Miguel Bahena, Ann Arbor, MI (US); Bradley G. Hochrein, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/621,536

(22) Filed: Feb. 13, 2015

(65) Prior Publication Data

US 2016/0236680 A1   Aug. 18, 2016

(51) Int. Cl.
  *G01C 22/00* (2006.01)
  *B60W 30/06* (2006.01)

(52) U.S. Cl.
  CPC .................................. *B60W 30/06* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,742,141 A * | 4/1998 | Czekaj | ............... | B62D 15/0285 180/167 |
| 7,277,123 B1 * | 10/2007 | Okamoto | .................. | B60R 1/00 348/148 |
| 8,154,426 B2 * | 4/2012 | Endo | ..................... | B62D 15/027 340/436 |
| 8,169,340 B2 * | 5/2012 | Oyobe | .................. | B60L 11/123 320/106 |
| 8,797,186 B2 * | 8/2014 | Pampus | ............... | B62D 15/027 340/439 |
| 2002/0005779 A1 * | 1/2002 | Ishii | ..................... | B62D 15/027 340/436 |
| 2002/0175832 A1 * | 11/2002 | Mizusawa | ............... | G06T 11/00 340/932.2 |
| 2005/0131645 A1 * | 6/2005 | Panopoulos | .......... | B60P 1/5457 701/472 |
| 2006/0235590 A1 * | 10/2006 | Bolourchi | .............. | B62D 7/159 701/41 |
| 2006/0287826 A1 * | 12/2006 | Shimizu | ................. | B60K 35/00 701/431 |
| 2009/0040068 A1 * | 2/2009 | Oyobe | .................. | B60L 11/123 340/932.2 |

(Continued)

FOREIGN PATENT DOCUMENTS

| DE | 102010022716 A1 | 12/2011 |
|---|---|---|
| DE | 102010022718 A1 | 12/2011 |

(Continued)

*Primary Examiner* — Jonathan L Sample
(74) *Attorney, Agent, or Firm* — Frank MacKenzie; Price Heneveld LLP

(57) ABSTRACT

A system for parallel parking a vehicle into a target parking space is provided herein. The system includes a user input device through which one or more parking parameter selections are made. The system also includes a park assist system for automatically steering the vehicle during the execution of a parallel parking maneuver, wherein the parallel parking maneuver is governed by the one or more parking parameter selections.

17 Claims, 7 Drawing Sheets

(56) References Cited

U.S. PATENT DOCUMENTS

| | | | |
|---|---|---|---|
| 2009/0261988 A1* | 10/2009 | Ramirez Serrano | G07C 9/00182 340/932.2 |
| 2009/0278709 A1* | 11/2009 | Endo | B62D 15/027 340/932.2 |
| 2010/0049402 A1* | 2/2010 | Tanaka | B60R 1/00 701/41 |
| 2010/0066825 A1* | 3/2010 | Kuboyama | G06K 9/00812 348/118 |
| 2010/0152972 A1* | 6/2010 | Attard | B62D 15/027 701/42 |
| 2011/0063131 A1* | 3/2011 | Toledo | B62D 15/0285 340/932.2 |
| 2011/0068953 A1* | 3/2011 | Toledo | B62D 15/0285 340/932.2 |
| 2011/0080305 A1* | 4/2011 | Toledo | B62D 15/028 340/932.2 |
| 2011/0184603 A1* | 7/2011 | Lavoie | B60W 10/08 701/22 |
| 2013/0096816 A1* | 4/2013 | Takano | B62D 15/0265 701/400 |
| 2013/0151060 A1* | 6/2013 | Lee | B62D 15/0285 701/25 |
| 2013/0229524 A1* | 9/2013 | Vovkushevsky | B60R 1/00 348/148 |
| 2014/0088836 A1* | 3/2014 | Staack | B60R 1/025 701/49 |
| 2014/0121883 A1* | 5/2014 | Shen | B62D 15/0285 701/28 |
| 2014/0121930 A1* | 5/2014 | Allexi | B60W 50/10 701/70 |
| 2014/0266803 A1* | 9/2014 | Bulan | G06K 9/00785 340/932.2 |
| 2014/0297107 A1* | 10/2014 | Wagner | B60W 30/06 701/36 |
| 2014/0303839 A1* | 10/2014 | Filev | G06F 3/0481 701/36 |
| 2014/0313059 A1* | 10/2014 | Shaffer | G08G 1/14 340/932.2 |
| 2014/0316632 A1* | 10/2014 | Shaffer | G05D 1/0088 701/23 |
| 2015/0127222 A1* | 5/2015 | Cunningham, III | B60R 1/00 701/41 |
| 2015/0142265 A1* | 5/2015 | Killy | F02N 11/0833 701/41 |
| 2015/0154868 A1* | 6/2015 | Neuner | G01C 21/3685 340/932.2 |
| 2015/0170287 A1* | 6/2015 | Tirone | G06Q 40/08 705/4 |
| 2016/0068158 A1* | 3/2016 | Elwart | B60W 10/00 701/41 |
| 2016/0257304 A1* | 9/2016 | Lavoie | B60W 30/06 |

FOREIGN PATENT DOCUMENTS

| | | |
|---|---|---|
| EP | 2608185 A1 | 6/2013 |
| JP | 2003175852 A | 6/2003 |

* cited by examiner

SYSTEM AND METHOD FOR PARALLEL PARKING A VEHICLE

FIELD OF THE INVENTION

The present invention generally relates to vehicle park assist systems and, in particular, to an improved park assist system and method for parallel parking a vehicle.

BACKGROUND OF THE INVENTION

Parallel parking a vehicle can be difficult for many drivers. Thus, there is a need for a vehicle park assist system that can execute a parallel parking maneuver into a target parking space with minimal driver action required while satisfying the comfort levels of the driver.

SUMMARY OF THE INVENTION

According to one aspect of the present invention, a system for parallel parking a vehicle into a target parking space is provided. The system includes a user input device through which one or more parking parameter selections are made. The system also includes a park assist system for automatically steering the vehicle during the execution of a parallel parking maneuver, wherein the parallel parking maneuver is governed by the one or more parking parameter selections.

According to another aspect of the present invention, a system for parallel parking a vehicle into a target parking space is provided. The system includes a display for displaying selectable parking parameters and a user input device through which one or more parking parameter selections are made. The system also includes a park assist system for automatically steering the vehicle during the execution of a parallel parking maneuver, wherein the parallel parking maneuver is governed by the one or more parking parameter selections.

According to yet another aspect of the present invention, a method for parallel parking a vehicle into a target parking space is provided. The method includes the steps of: displaying selectable parking parameters on a display; making one or more parking parameter selections via a user input device; and automatically steering the vehicle during the execution of a parallel parking maneuver governed by the one or more parking parameter selections.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
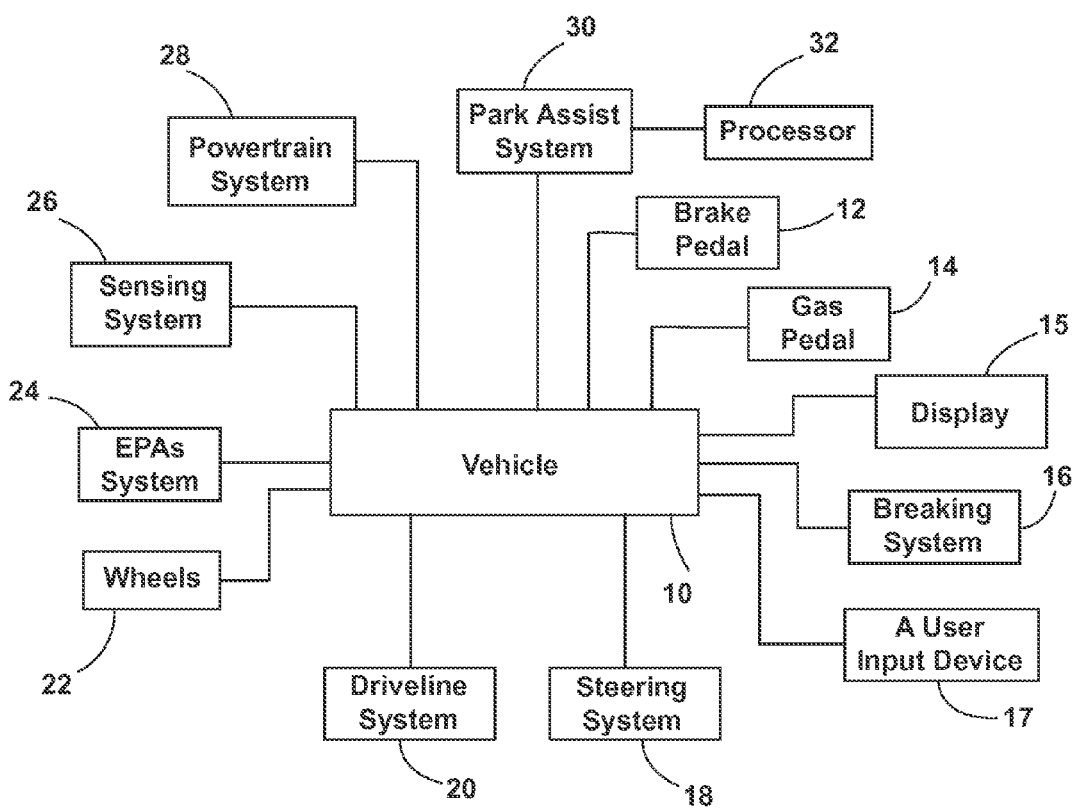
FIG. 1 illustrates a schematic diagram of a vehicle according to one embodiment.

Referring to FIG. 1, a schematic diagram of a vehicle 10 is shown according to one embodiment. The vehicle 10 includes at least the following equipment or systems: a brake pedal 12, a gas pedal 14, a display 15, a braking system 16, a user input device 17, a steering system 18, a driveline system 20, wheels 22, an electric power assisted steering (EPAS) system 24, a sensing system 26, a powertrain system 28, and a park assist system 30 having a processor 32. Alternatively, an electro-assisted power steering system (not shown) may be used instead of the EPAS system 24. Additionally, the vehicle 10 described herein may include other suitable equipment or systems in lieu of those described above.

Figure 2:
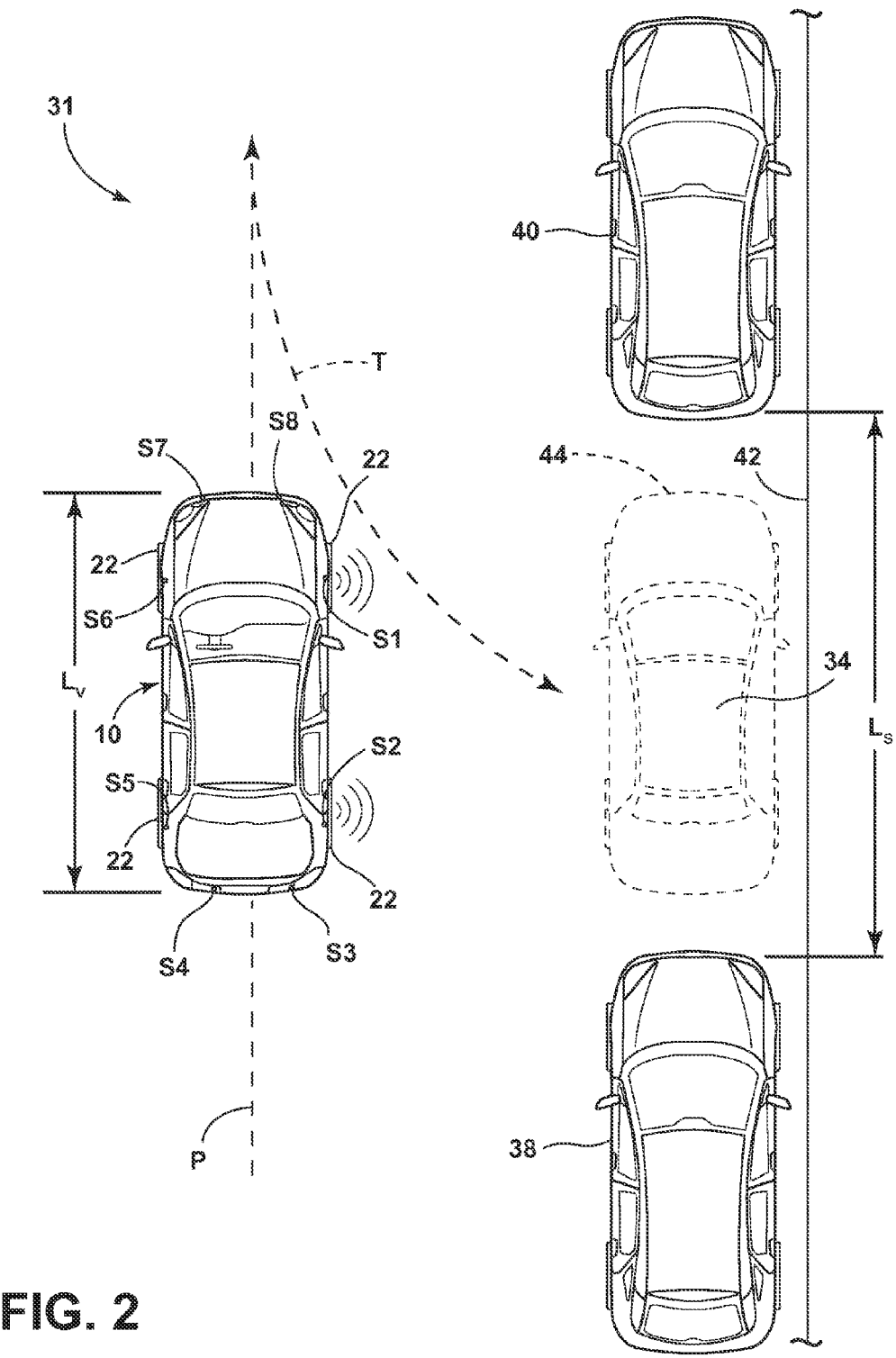
FIG. 2 illustrates a schematic diagram of a vehicle and a steering trajectory for backing the vehicle into a target parking space bounded by objects, according to one embodiment.

Referring to FIG. 2, a schematic diagram of a system 31 for parallel parking the vehicle 10 into a target parking space 34 is shown according to one embodiment. In the illustrated embodiment, the sensing system 26 includes ultrasonic sensors S1-S8 disposed variously on the front, sides, and rear of the vehicle 10. However, it should be appreciated that the number and/or location of the ultrasonic sensors S1-S8 may be other than illustrated, if so desired. Additionally or alternatively, the sensing system 26 may include radar, lidar, cameras, lasers, thermal sensors, GPS sensors, odometric sensors, or a combination thereof.

In operation, the ultrasonic sensors S1-S8 are configured to detect neighboring objects and their location relative to the position of the vehicle 10 while the vehicle 10 is driven past the objects. In the illustrated embodiment, the vehicle 10 is driven along path P and the objects correspond to a rear bounding object, shown as parked vehicle 38, a front bounding object, shown as parked vehicle 40, and a side bounding object, shown as curb 42, all of which may be detected by ultrasonic sensors S1 and S2 while the vehicle 10 drives past them at a slow speed. The processor 32 of the park assist system 30 processes information received from ultrasonic sensors S1 and S2 to determine a slot length Ls of the target parking space 34 and then determines whether the slot length $L_s$ is sufficient based on the known length $L_v$ of the vehicle 10.

Generally, the slot length $L_s$ is sufficient if it is larger than the length $L_v$ of the vehicle 10. Preferably the slot length $L_s$ provides enough space to allow the vehicle 10 to be parallel parked inside the target parking space 34 without coming into contact with objects detected by ultrasonic sensors S1-S8 of the vehicle 10. In some instances, however, the vehicle 10 may be required to make contact with an object in order to park inside the target parking space 34. For example, the wheels 22 of the vehicle 10 may come into contact with the curb 42. Upon determining that the slot length $L_s$ is sufficient, the processor 32 computes a steering trajectory T for parking the vehicle 10 into the target parking space 34 based on information received from one or more components of the sensing system 26 and the position of the vehicle 10 relative to neighboring objects. The driver of the vehicle 10 may then be notified that a parallel parking maneuver can be successfully performed into the target parking space 34 and is instructed to stop the vehicle 10 to commence the parallel parking maneuver. Notifications to the driver may include visual notifications such as text messages appearing on a display inside the vehicle 10, auditory notifications, haptic notifications, and/or other sensory notifications.

Depending on the slot length $L_s$ of the target parking space 34, the parallel parking maneuver may be variously performed as a series of maneuvers. Such maneuvers generally include backing the vehicle 10 along the steering trajectory T, stopping the vehicle 10 briefly inside the target parking space 34, and moving the vehicle 10 backward and/or forward inside the target parking space 34 before stopping the vehicle 10 in a final park position 44. As will be described in greater detail below, each maneuver may be performed semi-autonomously with the assistance of the driver. However, it should be appreciated that the maneuvers may also be performed autonomously in vehicles equipped with such functionality. Thus, it is to be understood that the methods and depictions described below are provided in regard to one possible vehicle configuration and should not be seen as limiting.

Figure 3:
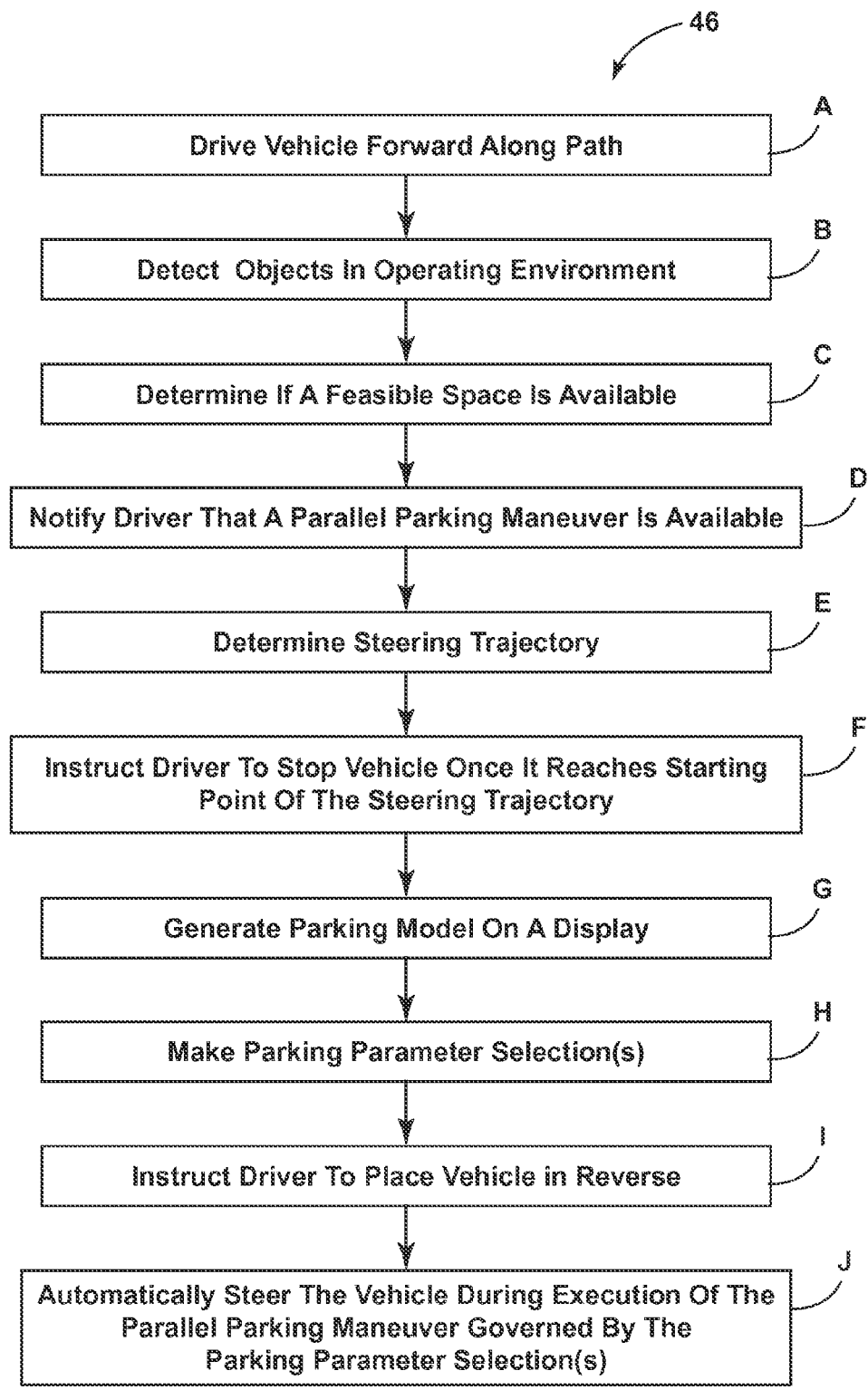
FIG. 3 illustrates a flow chart of a method for parallel parking a vehicle into a target parking space, according to one embodiment.

Referring to FIG. 3, a flow chart of a method 46 for parallel parking a vehicle 10 into a target parking space 34 is shown according to one embodiment. The method 46 may be executed using the vehicle 10 and related components described previously above. For purposes of illustration, various steps of the method 46 will be described in reference to FIGS. 4-7, which depict scenarios related to one embodiment of a parallel parking maneuver. The parallel parking maneuver is described below as being executed to the right of the vehicle 10. However, it should be appreciated that similar parking maneuvers may be executed to the left of the vehicle 10 by employing the method 46 described herein. Furthermore, while the steps of the method 46 are shown linearly in FIG. 3, it should be appreciated that some steps may be performed in different orders and/or concurrently with other steps.

The method 46 includes steps A and B, where the vehicle 10 is driven forward along a path P while the sensing system 26 of the vehicle 10 detects for the presence of objects in an operating environment 48 of the vehicle 10. For example, with reference to FIG. 4, the ultrasonic sensors S1-S8 of the vehicle 10 may detect a rear bounding object, which is shown as vehicle 48, a front bounding object, which is shown as vehicle 50, and a side bounding object, which is shown as curb 52. Once the objects have been detected, the park assist system 30 of the vehicle 10 may determine whether a feasible parking space is available at step C. For example, the park assist system 30 may determine that space 54 is a feasible parking space based on its slot length $L_s$. Once a feasible parking space has been found, the driver of the vehicle 10 may be notified that a parallel parking maneuver is available at step D.

Figure 4:
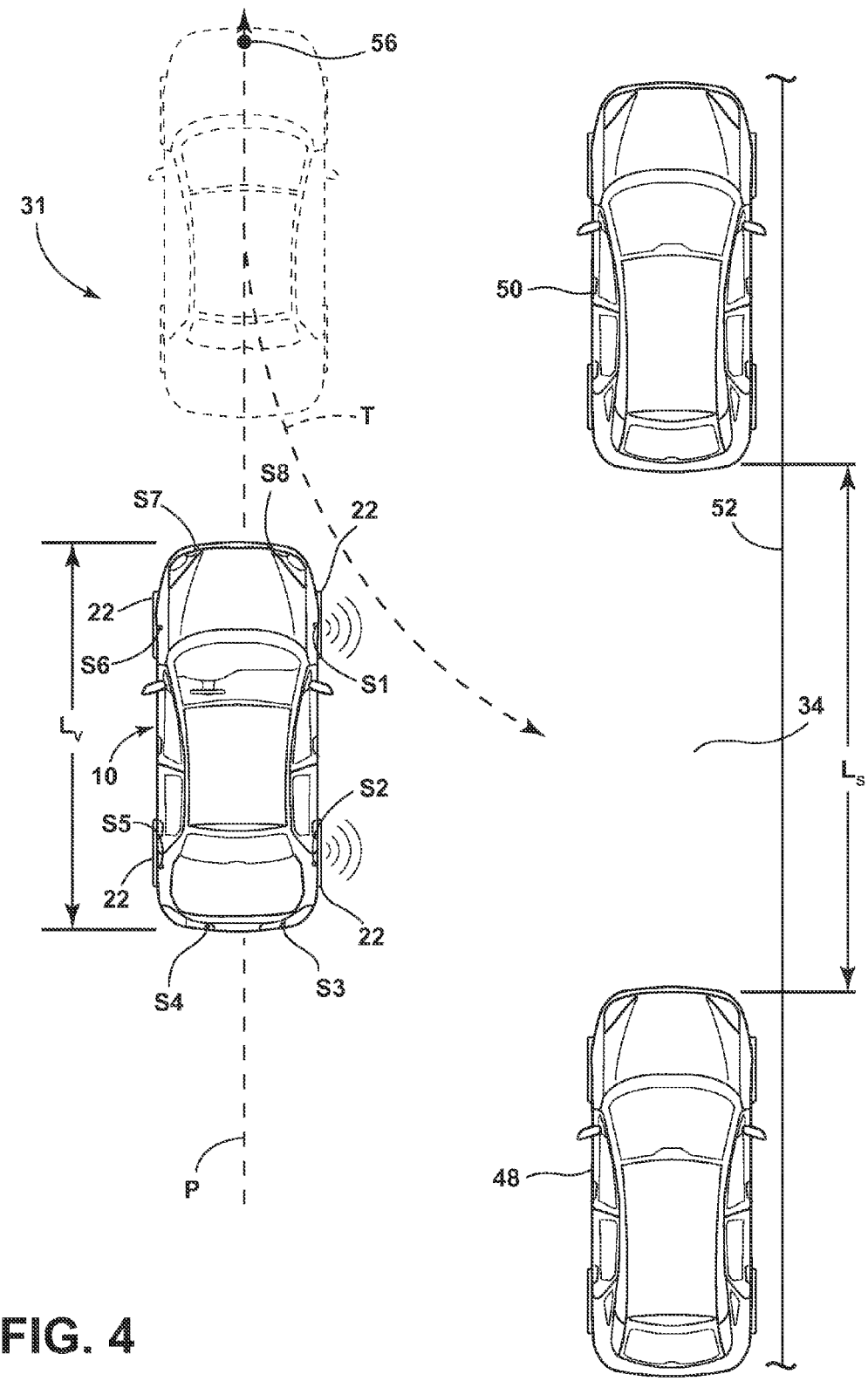
FIG. 4 illustrates a schematic diagram of a vehicle and a steering trajectory for backing the vehicle into a target parking space bounded by objects, according to one embodiment.
Figure 5:
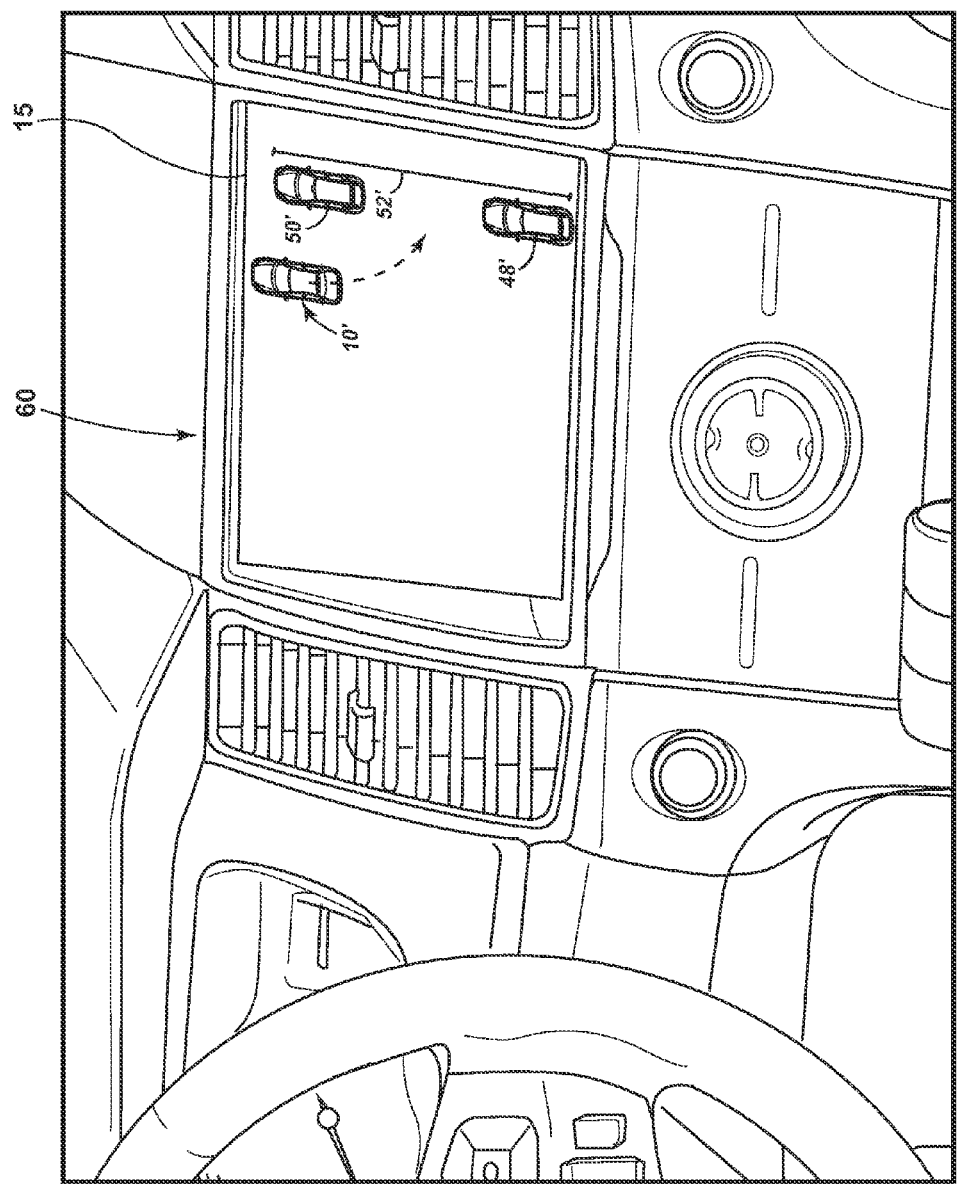
FIG. 5 illustrates a display on which a parking model is generated, according to one embodiment.

With further reference to FIG. 4, the park assist system 30 determines a steering trajectory T at step C for backing the vehicle 10 into the target parking space (e.g., space 54) and may also instruct the driver to pull the vehicle 10 forward until the vehicle 10 reaches a starting point 56 of the steering trajectory T so that the vehicle 10 can be successfully backed along the steering trajectory T. At step F, the driver is instructed to stop the vehicle 10 once it reaches starting point 56. At step G, the park assist system 30 may generate a parking model showing the vehicle 10 relative to the detected objects and the target parking space. For example, with reference to FIG. 5, a parking model 58 may be generated on the display 15 of the vehicle 10. The display 15 may be located in a center console 60 of the vehicle 10 and vehicle model 10' may be used to represent vehicle 10. Similarly object models 48', 50', and 52' may be used to represent vehicle 48, vehicle 50, and curb 52, which correspond to detected rear, front, and side bounding objects shown previously in FIG. 4. If desired, the display 15 may also show the steering trajectory T.

Figure 6:
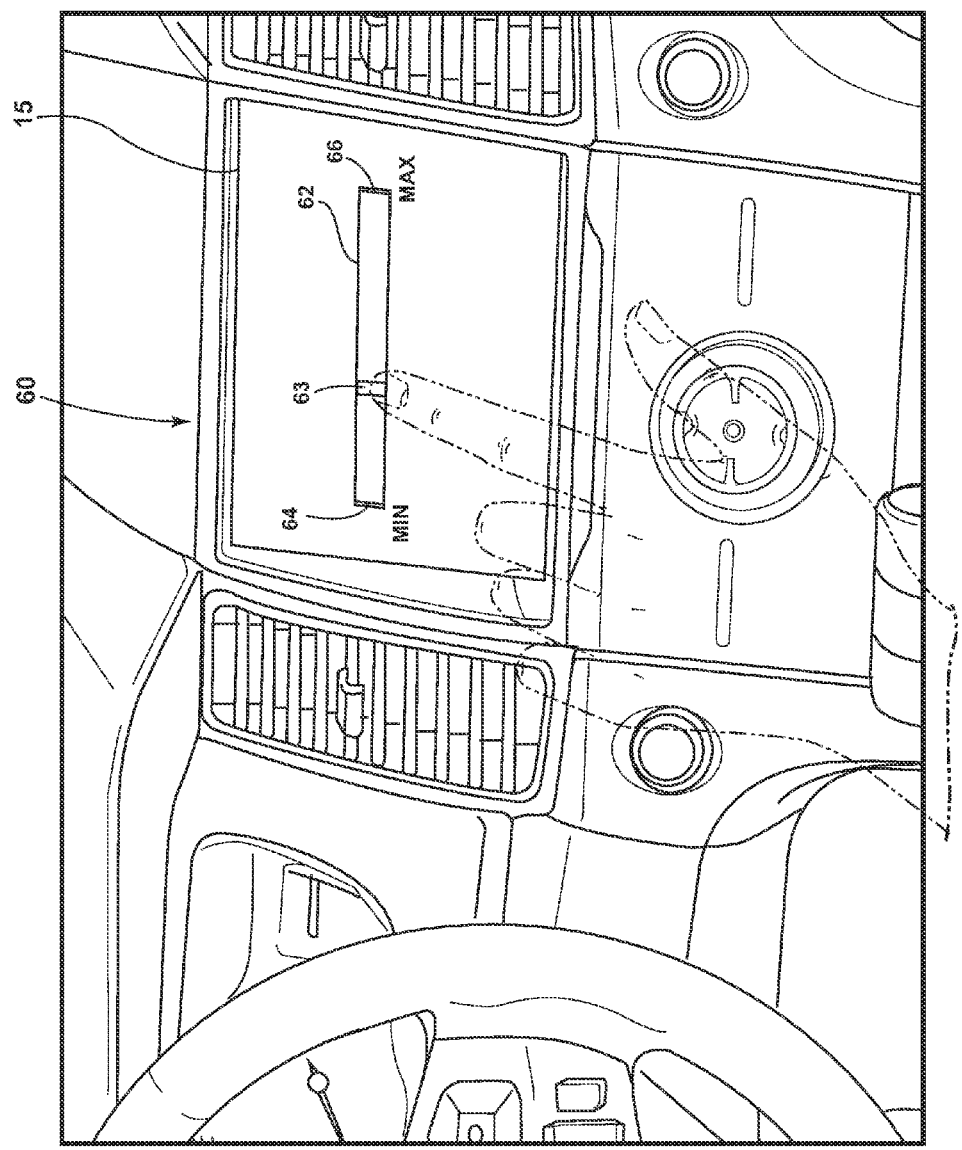
FIG. 6 illustrates a touch event for making a parking parameter selection, according to one embodiment.
Figure 7:
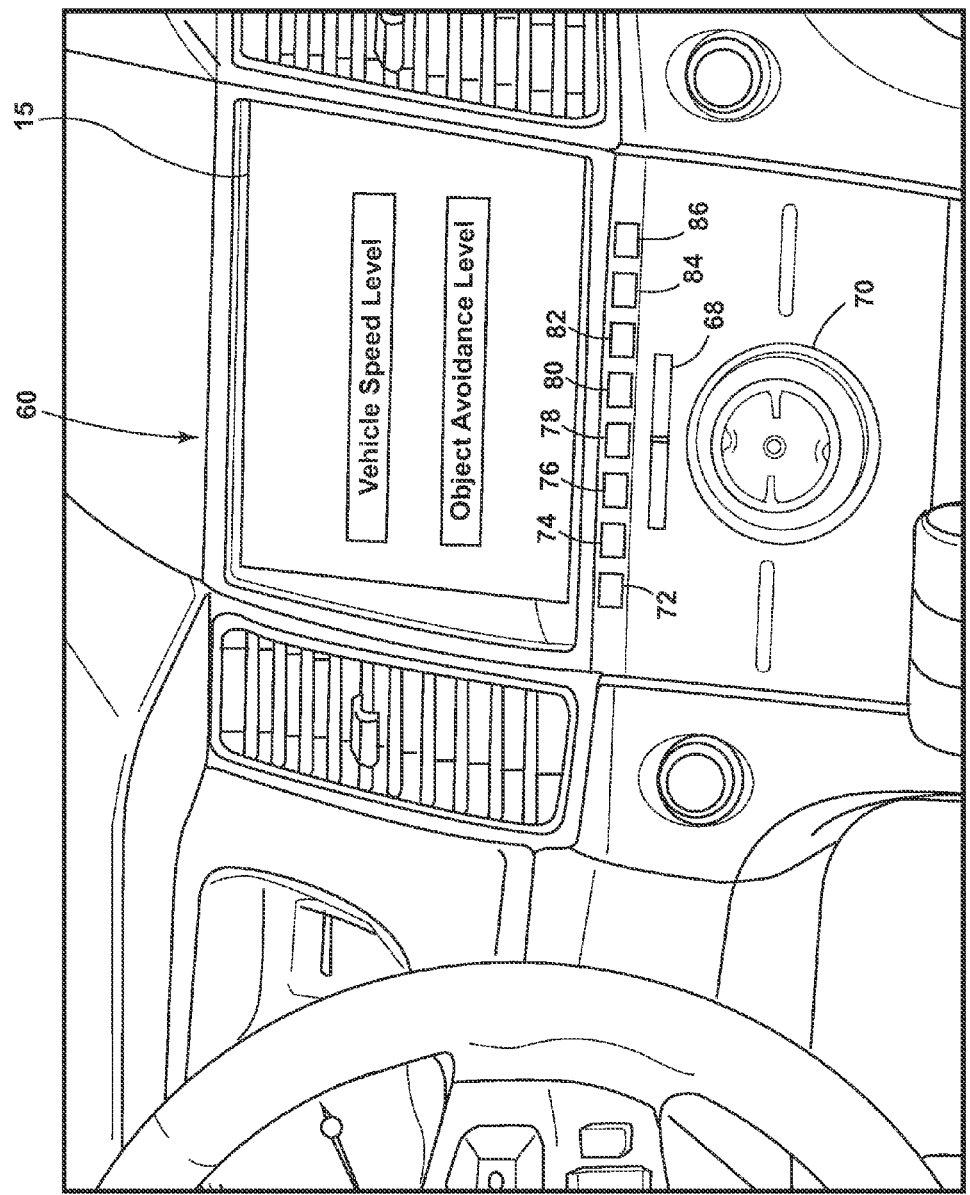
FIG. 7 illustrates a display on which parking parameters are shown as menu options.

At step H, the driver may make one or more parking parameter selections via the user input device 17 to control the manner in which the parallel parking maneuver is executed. As described below, the parking parameter selections may place constraints on vehicle speed and object avoidance levels while the vehicle 10 executes a backing maneuver. The user input device 17 may include a touchscreen of the display 15 configured to display selectable parking parameters and register one or more touch events for making the parking parameter selection(s). For example, the driver may touch vehicle model 10', thereby causing a vehicle speed bar 62 to be displayed on display 15, as shown in FIG. 6. The vehicle speed bar 62 allows the driver to make a speed parameter selection that limits the allowable speed of the vehicle while the parallel parking maneuver is executed. As shown, the vehicle speed bar 62 may include a movable cursor 63 that can be positioned between and inclusive of a minimum vehicle speed level 64 and a maximum vehicle speed level 66. Thus, drivers desiring to parallel park the vehicle 10 as quickly as possible may opt to select the maximum vehicle speed level 66 whereas more conservative drivers may opt to select the minimum vehicle speed level 64 or a vehicle speed level somewhere in between the minimum vehicle speed level 64 and the maximum vehicle speed level 66. To make a vehicle speed level selection, the driver may use his or her finger to drag the cursor 63 to the desired vehicle speed level. Thereafter, the driver may confirm his or her vehicle speed level selection through another touch event. Once confirmed, the vehicle speed level selection is communicated to the park assist system 30, which in turn may control the output of the driveline system 20 so that the vehicle 10 can is maintained at or below the selected vehicle speed level while the parallel parking maneuver is executed.

Additionally or alternatively, the driver may also restrict the allowable distance between the vehicle 10 and one or more bounding objects located proximate the target parking space. For example, the driver may touch one or more of the object models 48', 50', 52' thereby causing a corresponding object avoidance bar to be displayed on display 15. The object avoidance bar may have a similar appearance to the vehicle speed bar 62 and functions to allow the driver to select between and inclusive of a minimum object avoidance level and a maximum object avoidance level, wherein the minimum object avoidance level places lesser distance restrictions between the vehicle 10 and the selected bounding object whereas the maximum object avoidance level places greater distance restrictions between the vehicle 10 and the selected bounding object. It should be appreciated, however, that distance restrictions may vary depending on the selected bounding object. For example, if the bounding object corresponds to curb 52 or some other object having a low height relative to the ground, selecting the minimum object avoidance level may allow some parts of the vehicle 10 (e.g., the wheels 22) to come into contact with the curb 52, if necessary, during the parallel parking maneuver. Conversely, if the bounding object corresponds to vehicles 48 or 50, selecting the minimum object avoidance level may allow the vehicle 10 to come in extreme proximity to the object without actually colliding therewith.

Thus, selecting the minimum object avoidance level generally enables the vehicle 10 to be parallel parked into smaller parking spaces whereas selecting the maximum object avoidance level may require a larger parking space to be available. In assigning the allowable distance between the vehicle 10 and a selected bounding object, the park assist system 30 may rely on object avoidance selections made by the driver in addition to information received from the sensing system 26. If the driver does not wish to make any vehicle speed and/or object avoidance level selections, the park assist system 30 may assign a default vehicle speed and object avoidance level while the parallel parking maneuver is executed. In alternative embodiments, the selectable parking parameters described above can be presented to the driver as menu options on the display 15 and parking parameter selections can be made using other user input devices in the vehicle 10 such as a slider 68, a rotatable knob 70, one or more buttons 72-86, or a combination thereof, as exemplarily shown in FIG. 7.

According to one embodiment, the park assist system 30 may also rely on stored parking parameter selections so that the driver does not need to make parking parameter selections each time a parallel parking maneuver is executed. For example, a user may assign preferred parking parameter selections via the touchscreen of the display 15 or other human machine interface. The preferred parking parameter selections are communicated to the parking assist system 30, and in response, the parking assist system 30 will detect only target parking spaces that are compatible with the parking parameter selections specified by the user. The user need only assign his or her preferred parking parameter selections once and is free to change them at any time. As a result, the process of parallel parking a vehicle 10 becomes more expedited.

Once a feasible target parking space has been detected and the parking parameters have been established, the driver is instructed to place the vehicle 10 in reverse at step I. At step J, the park assist system 30 automatically steers the vehicle 10 during the execution of the parallel parking maneuver, which is governed by the parking parameter selection(s) made previously at step H. Throughout the parallel parking maneuver, the driver is responsible for applying gas (e.g., depressing the gas pedal 14) and stopping the vehicle 10 (e.g., depressing brake pedal 12) based on instructions provided by the park assist system 30. The driver may also be instructed to place the vehicle in drive and/or reverse, as many times as needed, so that the vehicle 10 can be successfully parked into the target parking space. With respect to fully autonomous vehicles, however, the application of gas and brakes, in addition to gear shifting, may be performed automatically by the park assist system 30.

Accordingly, a system and method for parallel parking a vehicle into a target parking space has been advantageously provided herein. Unlike previous systems and methods, the disclosure provided herein enables a driver to set various parking parameters based on his or her comfort levels.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A parallel parking system for a vehicle, comprising:
   a user input device for making one or more parking parameter selections to define an allowable size of a target parking space, wherein the one or more parking parameter selections comprises:
   a vehicle speed level selection that limits an allowable speed of the vehicle during the parallel parking maneuver; and
   an object avoidance level selection, wherein the object avoidance level selection is variable and allows contact between the vehicle and certain object types; and
   a park assist system for detecting target parking spaces compatible with the one or more parking parameter selections and automatically steering the vehicle during a parallel parking maneuver into a compatible target parking space pursuant to the one or more parking parameter selections.

2. The system of claim 1, wherein the user input device comprises a display for displaying selectable parking parameters.

3. The system of claim 2, wherein the display comprises a touchscreen configured to register one or more touch events for making the one or more parking parameter selections.

4. The system of claim 1, wherein the user input device comprises at least one selected from a slider, a rotatable knob, and one or more buttons.

5. The system of claim 1, wherein the object avoidance level selection restricts the allowable distance between the vehicle and a bounding object located proximate the target parking space during the parallel parking maneuver.

6. The system of claim 5, wherein the bounding object is one of a front bounding object, a rear bounding object, and a side bounding object.

7. A parallel parking system for a vehicle, comprising:
   a display showing a target parking space bounded by one or more objects;
   a user input device for making an object avoidance level selection for each object, wherein the object avoidance level selection is variable and allows contact between the vehicle and certain object types; and
   a park assist system for automatically steering the vehicle during a parallel parking maneuver pursuant to the object avoidance level selection.

8. The system of claim 7, wherein the display comprises a touchscreen configured to register one or more touch events for making the object avoidance level selection.

9. The system of claim 7, wherein the user input device comprises at least one selected from a slider, a rotatable knob, and one or more buttons.

10. The system of claim 7, wherein the object avoidance level selection places a constraint on object avoidance while the parallel parking maneuver is underway.

11. The system of claim 7, wherein a vehicle speed level selection is made using the user input device, the vehicle speed level selection comprising one of a minimum vehicle speed level, a maximum vehicle speed level, and a vehicle speed level therebetween, wherein the vehicle speed level selection limits the allowable speed of the vehicle during the parallel parking maneuver.

12. The system of claim 10, wherein the object avoidance level selection comprises one of a minimum object avoidance level, a maximum object avoidance level, and an object avoidance level therebetween, wherein the object avoidance level selection restricts the allowable distance between the vehicle and a corresponding object located proximate the target parking space during the parallel parking maneuver.

13. The system of claim 7, wherein the one or more objects is one of a front bounding object, a rear bounding object, and a side bounding object, and wherein the certain object types is a curb or other object having a low clearance relative to the vehicle.

14. A method for parallel parking a vehicle into a target parking space, comprising the steps of:

displaying a target parking space bounded by one or more objects on a display;

making an object avoidance level selection for each object, wherein the object avoidance level selection is variable and allows contact between the vehicle and certain object types;

providing a park assist system for detecting target parking spaces compatible with each object avoidance level selection; and automatically steering the vehicle during a parallel parking maneuver into a compatible target parking space pursuant to each object avoidance level selection.

15. The method of claim 14, wherein the step of making comprises registering one or more touch events in order to make each object level selection.

16. The method of claim 14, wherein the step of making comprises restricting the allowable distance between the vehicle and a bounding object located proximate the target parking space during the parallel parking maneuver.

17. The method of claim 16, wherein the bounding object is one of a front bounding object, a rear bounding object, and a side bounding object.

* * * * *